March 15, 1932.  V. G. APPLE  1,849,215
DYNAMO ELECTRIC MACHINE WINDING
Filed June 14, 1928  3 Sheets-Sheet 1
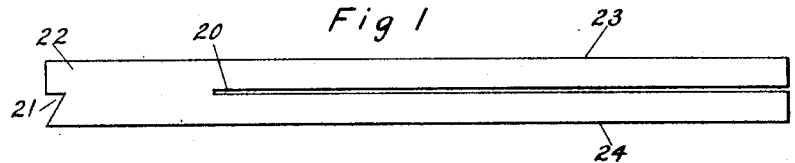 
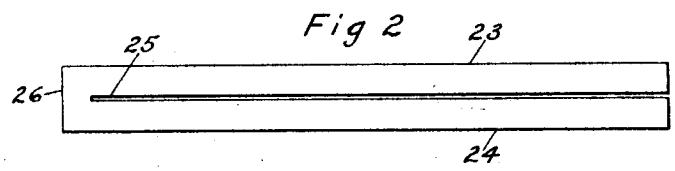 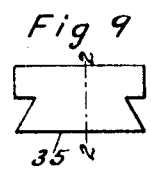
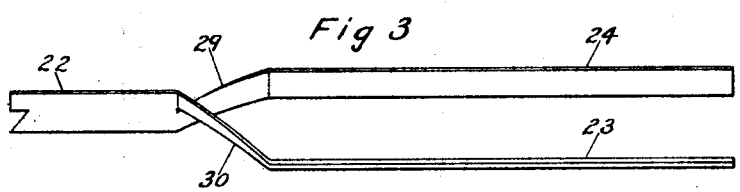 
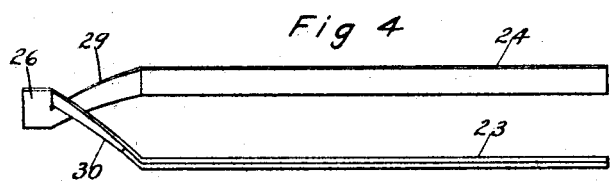 
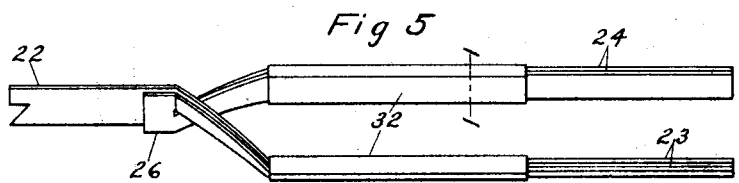 
INVENTOR.

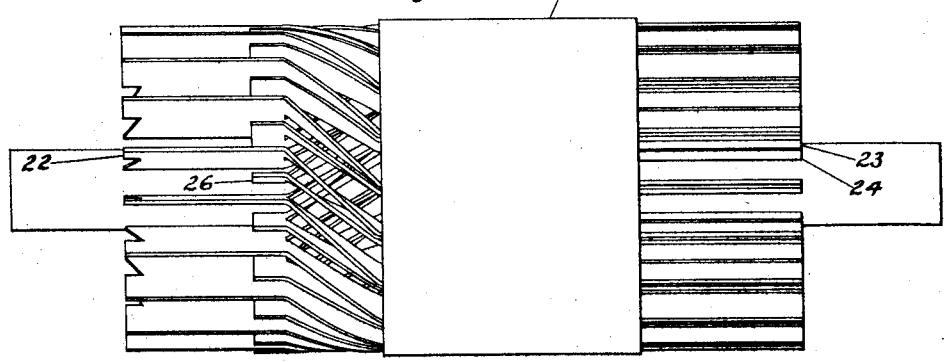
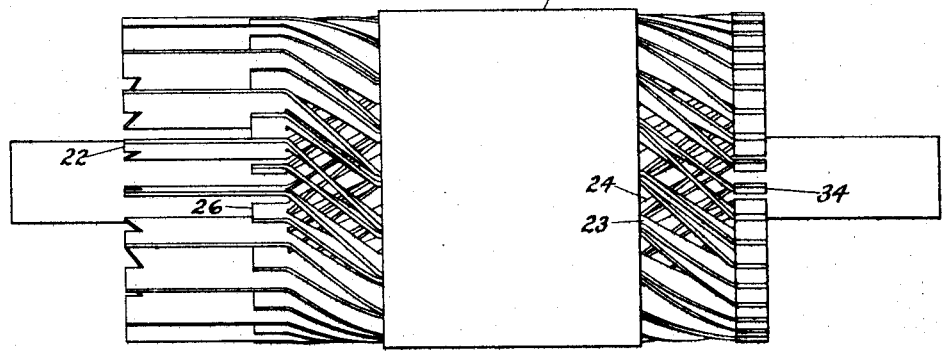
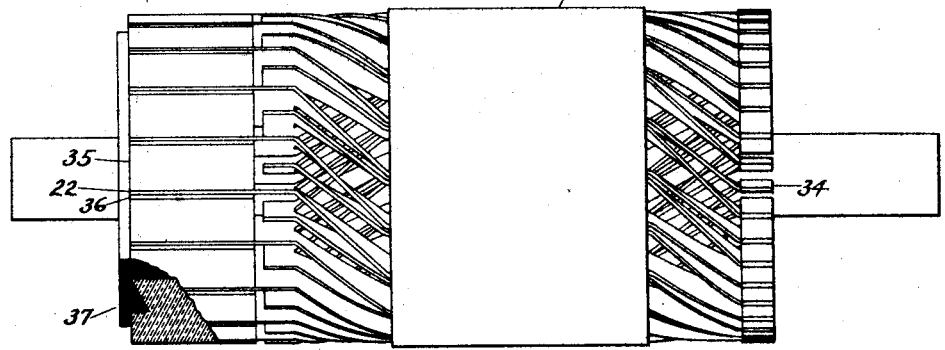

March 15, 1932.   V. G. APPLE   1,849,215
DYNAMO ELECTRIC MACHINE WINDING
Filed June 14, 1928   3 Sheets-Sheet 3

INVENTOR.

Patented Mar. 15, 1932

1,849,215

UNITED STATES PATENT OFFICE

VINCENT G. APPLE, OF DAYTON, OHIO

DYNAMO ELECTRIC MACHINE WINDING

Application filed June 14, 1928. Serial No. 285,358.

The invention is particularly applicable to an armature which has several turns of the armature circuit interposed between successive points of its connection to the commutator, and since a part of a winding connecting two commutator bars is known to the art as a winding element whether it consist of a single turn or a coil comprising a number of turns, we may for clearness refer to winding elements herein disclosed as plural turn winding elements.

One of the objects of the invention is to provide a winding composed of plural turn winding elements, the inductors of which are of maximum size relative to the core slot within which they are contained.

Another object of the invention is to provide a winding composed of plural turn winding elements which is of simple construction and which may be advantageously used in cores having closed or semi-closed as well as open slots.

Another object of the invention is to provide a winding composed of plural turn winding elements the turns of which are composed of strip stock of relatively thin section in proportion to width, to the end that eddy currents in the windings may be decreased.

Another object of the invention is to provide a winding composed of plural turn winding elements, which may be stacked, pressed into a core bent and joined to complete an armature, in a manner similar to that used in building my single turn armature for which a number of patents have already been allowed and others pending.

Other objects of the invention will be readily apparent to those skilled in the art from a consideration of the following description when taken in conjunction with the drawings wherein—

Fig. 1 is an outline of a turn of the winding which connects directly to the commutator.

Fig. 2 is an outline of a turn of the winding which does not connect directly to the commutator.

Fig. 3 shows the turn Fig. 1 after bending.

Fig. 4 shows the turn Fig. 2 after bending.

Fig. 5 shows a turn Fig. 3 and a turn Fig. 4 assembled into an inductor group for a two turn winding.

Fig. 6 is a section taken on line 1—1 Fig. 5 showing how the several turns are insulated.

Fig. 7 shows a form of connector drawn to a relatively larger scale which is used to join the two parts of a winding turn.

Fig. 8 shows another form of connector drawn to a relatively larger scale which is used to join the two parts of a winding turn.

Fig. 9 is one of the commutator pads.

Fig. 10 is a cross section taken on line 2—2 of Fig. 9.

Fig. 11 shows a set of inductor groups after they have been pushed through the slots of a core.

Fig. 12 shows how the projecting ends in Fig. 11 are bent and joined to complete the winding.

Fig. 13 is the completed armature shown partly in section.

Figure 14:
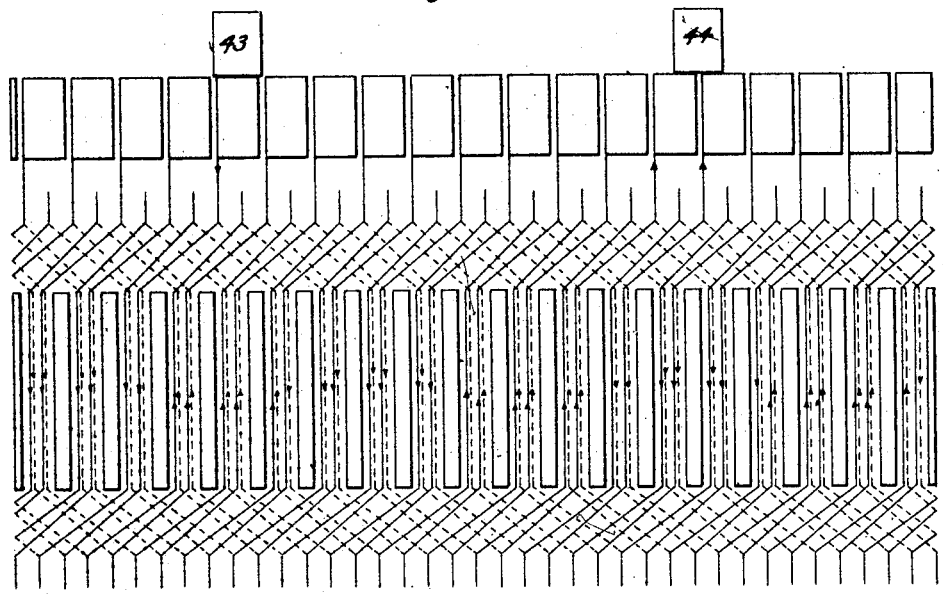
Fig. 14 shows diagrammatically the complete wave winding with the circumference laid out flat for clearness.

When the current of an armature is to be of relatively high voltage and low amperage is is frequently necessary to so design the winding that it will have a large number of turns of relatively small capacity connected in series. A winding to fulfill such requirements is usually provided by winding a number of turns of insulated wire into each of a number of coils comprising the winding, laying the coils in the proper core slots and connecting the beginning and end of each coil one at a time to the proper commutator segments.

When the current of an armature is to be of relatively low voltage and high amperage the bar wound single-turn two layer armature is most frequently used, and as the total number of turns of such an armature equals the total number of commutator segments a limit to the total number of turns is reached when the commutator has been divided into segments of minimum thickness consistent with practical design.

When an armature winding is of the single-closed wave connected type its circuit consists of two parallel paths with half its coils in series in each path, while when it is lap connected they are arranged in as many parallel paths as there are field poles, so that the wave connected armature is adaptable to a ralatively higher voltage.

The foregoing paragraph is but a statement of facts well known to the art and is herein repeated for illustrative purposes only as in the following I seek to disclose my method of making a bar wound armature having bars so thin and in such number as to make it impracticable to subdivide the commutator into as many segments or the core into as many slots as there are turns in the winding, making it necessary to interpose several turns of the winding between commutator segments, and to lay several inductors side by side in each slot. As the bars of this winding are relatively thin in proportion to their width we may refer to it as a strip or ribbon winding.

As only one of a plurality of turns connects to the commutator they are produced in two lengths. In Fig. 1 a length of ribbon stock has been split, as at 20, and notched, as at 21, leaving a commutator end 22 and two inductor legs 23 and 24. The inductor leg 23 forms part of the outer layer of the winding and may, for clearness, be termed an outer inductor leg, while the inductor leg 24 forms part of the inner layer of the winding so may be called an inner inductor leg.

In Fig. 2 a length of ribbon stock has been split, as at 25, leaving a closed end 26, an outer inductor leg 23 and an inner inductor leg 24. The parts Figs. 1 and 2 may also be cut from flat sheet stock, or when desirable they may be cut from ribbon stock which is slightly thicker at the edge 27 than at the edge 28, such stock being of a wedge shaped cross section and where it is used the slots of the armature core should be made to correspond.

After parts have been cut, as in Figs. 1 and 2, they are bent, as at 29 and 30, Figs. 3 and 4, the outer inductor legs 23 in one direction and the inner inductor legs 24 in the other direction, and while I have here shown them as being bent substantially equal amounts in opposite directions, they may be bent the one more than the other or in the same direction as long as the algebraic sum of the bends will spread the legs sufficiently to compose a turn of the winding which is usually approximately a pole pitch. For clearness in description we may refer to parts as shown in Figs. 3 and 4 as turns.

After a number of turns, as in Figs. 3 and 4, are made they are assembled into inductor groups and each group may comprise one turn Fig. 3 and one or more turns Fig. 4, the sum of the turns Fig. 3 and Fig. 4 contained in the group being equal to the number of turns of the winding interposed between successive points of connection to the commutator. For purposes of illustration, in Fig. 5 I have shown a group comprising only two turns. In making up these groups it is necessary to place insulation 31 between successive inductors and further insulation 32 to prevent contact with the core slots. A cross section through inductors and insulation taken on line 1—1, Fig. 5 is shown in Fig. 6. When there are less core slots than commutator connections several groups Fig. 5 may be joined into one by insulation in a manner similar to that shown in Fig. 6.

Fig. 11 shows an armature core 33 into which a complete set of inductor groups of two turns each have been assembled with the straight ends of the turns projecting through and beyond the core. A method of stacking a complete set of winding turns, pressing them simultaneously into the slots of a core, bending them simultaneously to form pairs and joining the pairs to complete the winding circuit is the subject of a patent which has already been allowed, and is used in combination with new features herein presented.

Fig. 12 shows the projecting ends of the inductor groups bent and joined to compose a complete winding. Connectors 34 may be employed to surround a pair of ends. These connectors may be cut from a flat sheet and bent as in Fig. 7, or they may be made by flattening short pieces of thin tubing as in Fig. 8. Instead of bending the projecting ends of the winding to helical formation they may be joined to separate end connectors of involute or other form.

In the foregoing I have shown and described one way of making a winding having plural turn winding elements and also the method of making the winding turns by splitting a length of ribbon stock. This method leaves one end of a winding turn closed so that it is necessary to make but one joint per turn to complete the winding circuit and these joints are all at one end of the armature. It is to be understood, however, that I do not wish to limit myself to the methods disclosed as occasions may arise where it is desirable to use separate ribbons for the inner and outer inductor legs which of course would make necessary two joints per turn, and one-half of the total number of joints would be at one end of the armature and one-half at the other. When separate ribbons are so used one of the joints of each turn may be made before they are entered into the core slots, or the entire set of straight ribbons may be placed in the slots and the projecting ends at both ends of the core properly bent and joined.

In the drawings I indicate closed slots in the armature core, but the winding herein disclosed may also be adapted to core slots that are semi-closed or entirely open, and when open slots are to be used along with winding turns, having separate inner and outer inductor legs, all of the bends at both ends of the inductors may be made separately, and the bends may be made before they are grouped and placed into the slots, and while it may be considered a preferred method to assemble the winding turns into groups which are insulated before they are entered into the core, the turns and the insulation may be separately placed in the core slots if so desired.

In the drawings I show the armature as having the commutator at the closed ends of the winding turns but the commutator may be formed in similar manner by prolonging the ends which were originally open. Requirements of common practice must be complied with, such as keeping the outer and inner layers of the winding electrically separated, etc.

After a complete set of these thin inductors have been joined into a winding it will be found that there is considerable space left between successive ends 22 of the winding and it is therefore advisable to add separate commutator pads 35 preferably of an outline shown in Fig. 9, and having a cross section as in Fig. 10 to each commutator end 22 of the winding, to complete the commutator. Spacers of insulating material 36 must be supplied between commutator segments.

After a commutator pad 35 has been added to each commutator end 22 so that a pad and an end together compose a commutator segment, a means of binding the commutator together must be supplied and a preferred means is shown in the part broken away at 37, Fig. 12, and consists of placing the assembled armature in a die and moulding insulation material about the parts to form a unitary structure. Other means of holding the commutator parts together may be employed such as using a nut to press a washer, which has a conical interior diameter, against the notched ends 21 of the turns similar to methods now in common practice in commutator building and while a single notch is shown at 21, Fig. 1, more and different notches may be employed, or two notches pointing in opposite directions may be cut in the turns similar to those in the commutator pad Fig. 9, or when moulded insulation is used as a binding means the notches may be eliminated altogether by any such method as moulding a ring of insulating material about the commutator at one or both of its ends.

And while the description and drawings show the winding ends 22 as forming a part of the brush track of the commutator, when desired suitable points in the circuit may be joined to the risers of a commutator of the conventional type. While in the drawings I show a structure in which the commutator is equal in diameter to the winding, it is obvious that the commutator and winding may be made of relatively different diameters if the winding turns are properly formed and the thickness of the commutator pads is properly proportioned and when there is such difference in relative diameters the portion of the winding turns known as leads, which in the drawings extend from the ends of the core helically in concentric cylindrical layers, may extend in conical layers or in longitudinally adjacent layers in which the leads extend spirally away from the axis in involute end connected formation.

Figure 15:
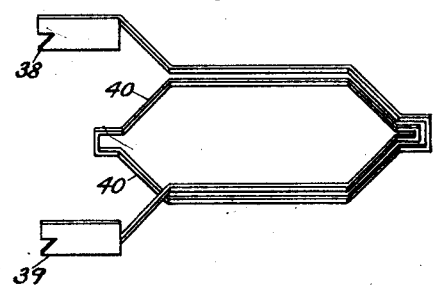
Fig. 15 shows the conventional arrangement of the two turns comprising a winding element of a wave winding.

Heretofore in providing a wave winding having plural turn winding elements it has been the custom to wind a coil having the desired number of turns between commutator segments in the manner diagrammatically shown in Fig. 15, the coil being wound of round or square wire and laid in the open slots a coil at a time around the active surface of an armature core. The commutator pitch of such a winding element is the distance from points 38 to 39.

As the new type winding herein disclosed consists of but two layers, and successive half-turns alternate from the outer to the inner layer, it is apparent that such a winding may not lap back on itself, as at 40 Fig. 15, for the reason that in a two layer winding the bends or leads of all inner inductor legs must be in the same direction and the bends or leads of all outer inductor legs must be in the same direction in order that all leads may clear.

Figure 16:
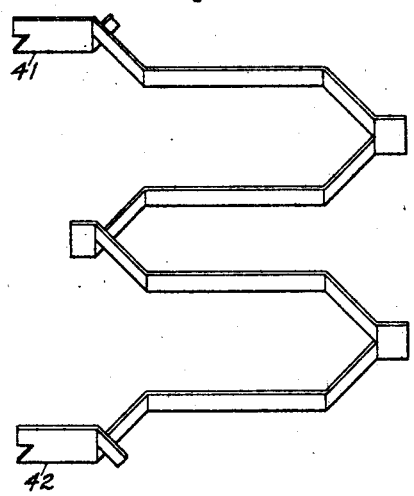
Fig. 16 shows the two turns comprising a winding element of a wave winding when my new method has been employed.

In Fig. 16 I show diagrammatically a two turn winding element which has been removed from the armature, and the two turns are shown to progress in wave fashion in the same general direction, the inner inductor legs being all in one plane and the outer inductor legs being all in another plane and it will be noticed that the points of connection to the commutator, as 41 and 42, are widely separated, the commutator pitch being as much greater than that of the conventional coil Fig. 15 as there are turns between commutator segments.

In Fig. 14 a complete winding for an armature to be used in a 6 pole field is laid out flat, the dotted lines representing inductors of the inner layer and the solid lines representing inductors of the outer layer, and by tracing the direction of the current by arrows from a positive brush 43 to a negative brush 44 it will be found that the flux distribution from this winding is identical with the conventional type, and we have gained by this method all of the many advantages inherent in any closed slot construction into which the winding has been endwise entered, with the further advantage of having adjacent inductors of relatively thin and wide stock to provide a laminated effect against eddy currents.

The drawings Figs. 11 to 15 show only how my method is carried out to produce a wave winding. It may be readily seen, however, that should a lap winding be desired, it may be produced with but slight variation in the procedure, the only difference being that instead of bending the projecting ends 23 and 24 of Fig. 11 as they are shown in Fig. 12 they must be bent so that the outer legs take the direction of the inner legs shown and the inner legs take the direction of the outer legs shown, so that the bends made on the projecting ends are precisely the reverse for a lap as for a wave winding. Connecting the open ends may be done in precisely the same manner in both cases.

Having described my invention what I claim is—

1. For winding a two layer plural turn bar wound armature having a core with closed or partly closed winding apertures, a winding unit comprising a set of separate loops each comprising an outer layer bar, a spaced apart inner layer bar, and an integral yoke connecting the two bars together at one end, the other ends of the bars being left spaced apart, said loops being arranged with all of the outer layer bars adjacent in one group and all of the inner layer bars adjacent in another group, insulation separating adjacent bars of each group from each other, and means to bind the bars of each group together.

2. For winding a two layer plural turn bar wound armature having a core with closed or partly closed winding apertures, a winding unit comprising a set of separate loops each comprising an outer layer bar, a spaced apart inner layer bar, and an integral yoke connecting the two bars together at one end, the other ends of the bars being left spaced apart, said loops being arranged with all of the outer layer bars adjacent in one group and all of the inner layer bars adjacent in another group, insulation separating adjacent bars of each group from each other, and insulation completely surrounding the members of each group to bind them together.

3. A winding unit such as described in claim 1 with the yoke at the closed end of one loop of the set extended for connection to a commutator.

In testimony whereof I hereunto set my hand.

VINCENT G. APPLE.